United States Patent
Otsuka et al.

(10) Patent No.: US 8,949,972 B2
(45) Date of Patent: Feb. 3, 2015

(54) INFORMATION RECORDING DEVICE, RECORDING MEDIUM, AND INFORMATION RECORDING SYSTEM

(71) Applicant: Panasonic Intellectual Property Management Co., Ltd., Osaka (JP)

(72) Inventors: Takeshi Otsuka, Hyogo (JP); Haruo Ohta, Kyoto (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 55 days.

(21) Appl. No.: 13/782,173

(22) Filed: Mar. 1, 2013

(65) Prior Publication Data
US 2013/0239203 A1 Sep. 12, 2013

(30) Foreign Application Priority Data

Mar. 9, 2012 (JP) .................................. 2012-052671
Feb. 19, 2013 (JP) .................................. 2013-029786

(51) Int. Cl.
G06F 7/04 (2006.01)
G06F 21/45 (2013.01)

(52) U.S. Cl.
CPC ...................................... *G06F 21/45* (2013.01)
USPC ............................................. 726/18; 713/182

(58) Field of Classification Search
CPC ......... G06F 21/31; G06F 21/46; G06F 21/45; G06F 21/44; G06F 2221/2131; H04L 63/083
See application file for complete search history.

(56) References Cited

U.S. PATENT DOCUMENTS

| | | | |
|---|---|---|---|
| 6,737,956 B1* | 5/2004 | Kimura | 340/5.54 |
| 7,444,470 B2* | 10/2008 | Makita | 711/115 |
| 8,230,455 B2* | 7/2012 | Hazlewood et al. | 725/5 |
| 8,286,000 B2* | 10/2012 | Vedula et al. | 713/183 |
| 8,370,925 B2* | 2/2013 | Childress et al. | 726/18 |
| 8,413,222 B1* | 4/2013 | Cooley et al. | 726/6 |
| 2006/0271789 A1* | 11/2006 | Satomura et al. | 713/183 |
| 2007/0143627 A1* | 6/2007 | Hsieh et al. | 713/183 |
| 2008/0120508 A1* | 5/2008 | Marconi et al. | 713/184 |
| 2008/0282091 A1* | 11/2008 | Ashok et al. | 713/183 |

FOREIGN PATENT DOCUMENTS

JP 2004-30581 1/2004

* cited by examiner

*Primary Examiner* — Fikremariam A Yalew
(74) *Attorney, Agent, or Firm* — Wenderoth, Lind & Ponack, LLP

(57) ABSTRACT

An information recording system includes a recording medium capable of limiting a function by password and an information recording device for controlling the recording medium. The recording medium stores an input password, counts updating event(s) of a password, stores the update count of the password, outputs information stored in the password related information storage according to a READ request issued from the information recording device, compares a input password with a password stored in the password register, limits a predetermined function of the recording medium according to the comparison result from the password comparator. The information recording device stores a password and a password identification ID which is associated with the update count of the password, selects a password with reference to the update count of the password and the password identification ID and outputs the selected password into the recording medium to compare the passwords.

10 Claims, 12 Drawing Sheets

Fig.3

| FUNCTION ID | IDENTIFICATION ID | NEW PASSWORD | OLD PASSWORD |
|---|---|---|---|
| 1BYTE | 1BYTE | 16BYTES | 16BYTES |

Fig. 4

| FUNCTION ID | FUNCTION NAME |
|---|---|
| 00000001 | SET OF PASSWORD |
| 00000010 | CLEAR OF PASSWORD |
| 00000100 | CHANGE OF PASSWORD |
| 00001000 | SET OF VERSION INFORMATION |
| OTHERS | RESERVED |

Fig.6

| VERSION INFORMATION | PASSWORD CLASSIFICATION |
|---|---|
| 00000000 | INITIAL PASSWORD |
| 00000001 | PASSWORD VERSION 1 |
| 00000010 | PASSWORD VERSION 2 |
| 00000011 | PASSWORD VERSION 3 |
| ... | ... |
| 11111111 | RESERVED |

Fig.7A

VERSION INFORMATION: 1

| LOWER 3 BITS OF THE UPDATE COUNT OF THE PASSWORD | PASSWORD |
|---|---|
| 000 | AAA1 |
| 001 | AAB3 |
| 010 | BBA4 |
| 011 | CCS0 |
| 100 | A9A7 |
| 101 | Bbb8 |
| 110 | CCC9 |
| 111 | DDDA |

Fig.7B

VERSION INFORMATION: 2

| LOWER 3 BITS OF THE UPDATE COUNT OF THE PASSWORD | PASSWORD |
|---|---|
| 000 | NAAF |
| 001 | MAB0 |
| 010 | OBA6 |
| 011 | KCS7 |
| 100 | B9A7 |
| 101 | Vbb3 |
| 110 | NCCb |
| 111 | SDD3 |

Fig.9A

| MEDIA ID | UPDATE COUNT OF PASSWORD | PASSWORD |
|---|---|---|
| 0000 | 001 | AAA1 |
| 0001 | 101 | AAB3 |
| 0010 | 010 | BBA4 |
| 0011 | 011 | CCS0 |

Fig.9B

| MEDIA ID | UPDATE COUNT OF PASSWORD | PASSWORD |
|---|---|---|
| 0000 | 010 | NAAF |
| 0010 | 100 | BAA4 |

Fig.9C

| MEDIA ID | UPDATE COUNT OF PASSWORD | PASSWORD |
|---|---|---|
| 0000 | 011 | A8A6 |
| 0001 | 101 | AAB3 |
| 0010 | 010 | BBA4 |
| 0011 | 011 | CCS0 |

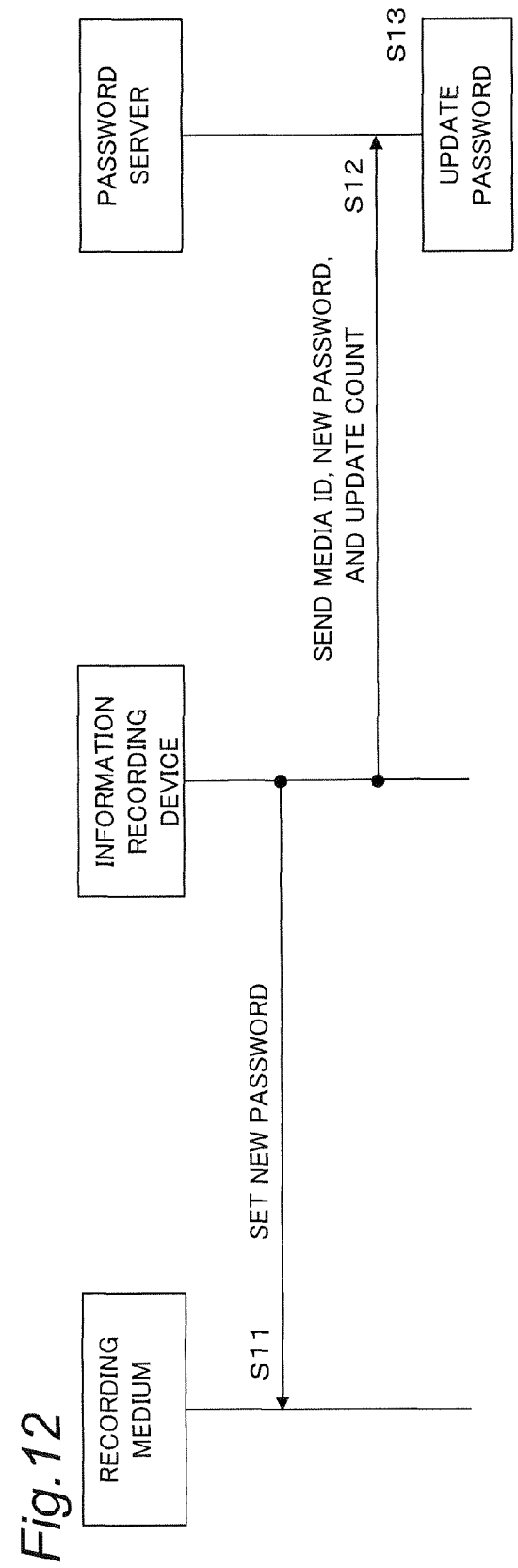

INFORMATION RECORDING DEVICE, RECORDING MEDIUM, AND INFORMATION RECORDING SYSTEM

BACKGROUND

1. Technical Field

The present disclosure relates to a recording medium capable of limiting functions by password, an information recording device for controlling the recording medium, and an information recording system including them.

2. Related Art

When one tries to access data recorded on recording media such as a memory card, some recording media may require the person to input a password to ensure safety of the data. However, inputting of password is troublesome.

JP-A-2004-030581 discloses a technology for allowing a user to avoid the troublesomeness of password input. Specifically, a default input password is stored in the information recording device and an access security password is stored in the recording medium. In the case where a password is not input by the user to use the recording medium in the information recording device, the default input password is compared with the access security password. When the default input password matches with the access security password, access limitation to the recording medium is canceled. As a result, the user is allowed to access the recording medium without inputting the password.

SUMMARY

There is a case where a plurality of recording media belonging to different users is required to be used in a single camera recorder, for example. In that case, there is a need for avoiding troublesomeness of password input while ensuring security.

The present disclosure provides an information recording device, a recording medium, and an information recording system capable of allowing a user to avoid troublesomeness of password input while ensuring security in the case where a plurality of recording media belonging to different users is required to be used in a single camera recorder, for example.

In a first aspect of the present disclosure, an information recording system is provided.

The information recording system includes a recording medium capable of limiting a function by password and an information recording device for controlling the recording medium.

The recording medium includes:

a password register operable to store an input password;

a password update counter operable to count the updating event(s) of a password, the password being stored in the password register;

a password related information storage operable to store the update count of the password;

a password related information provider operable to output information stored in the password related information storage according to a REND request issued from the information recording device;

a password comparator operable to compare a input password with a password stored in the password register; and a function limiter operable to limit a predetermined function of the recording medium according to the comparison result from the password comparator, and the information recording device comprises:

a password manager operable to store a password and a password identification ID which is associated with the update count of the password; and a limitation cancel requester operable to select a password stored in the password manager with reference to the update count of the password and the password identification ID output from the password related information provider and output the selected password into the recording medium in order to cause the password comparator of the recording medium to compare the passwords.

In a second aspect of the present disclosure, a recording medium is provided.

The recording medium includes:

a password register operable to store an input password;

a password update counter operable to count the updating event(s) of a password, the password being stored in the password register;

a password related information storage operable to store the update count of the password;

a password related information provider operable to provide information stored in the password related information storage according to a READ request issued from the information recording device;

a password comparator operable to compare a input password with a password stored in the password register; and a function limiter operable to limit a predetermined function of the recording medium according to the comparison result from the password comparator.

In a third aspect of the present disclosure, a recording system is provided.

The information recording system includes a recording medium capable of limiting a function by password and an information recording device for controlling the recording medium.

The recording medium includes:

a password register operable to store an input password;

a password update counter operable to count the updating event(s) of a password, the password being stored in the password register;

a password related information storage operable to store the update count of the password;

a password related information provider operable to provide information stored in the password related information storage in response to a READ request issued from the information recording device;

a media ID storage operable to store a media ID specific to the recording medium;

a password comparator operable to compare a input password with a password stored in the password register; and a function limiter operable to limit a predetermined function of the recording medium according to the comparison result from the password comparator, and the information recording device comprises:

a password manager operable to store media password information which associates the media ID with a password and the update count of the password; and a limitation cancel requester operable to select a password stored in the password manager with reference to the media ID and the update count of the password obtained from the recording medium and input the selected password in the recording medium in order to cause the password comparator of the recording medium to compare the passwords;

a password creator operable to create a new password; and a password setter operable to register the new password created in the password creator to the password register of the recording medium.

In a fourth aspect of the present disclosure, an information recording system is provided.

The information recording system including an information recording device for controlling a recording medium which is capable of limiting a function by password and a password server for managing the password.

The information recording device includes:

a password manager operable to store media password information which associates a media ID specific to the recording medium with a password and the update count of the password;

a limitation cancel requester operable to select a password stored in the password manager with reference to the media ID and the update count of the password obtained from the recording medium and input the selected password in the recording medium in order to cause the password comparator of the recording medium to compare the passwords;

a password creator operable to create a new password;

a password setter operable to register the new password created in the password creator to the password register of the recording medium;

a data communicator operable to send/receive the media password information;

a server verifier operable to verify the password server via the data communicator;

a media password information provider operable to send the new password, the update count of the password after setting the new password, and the media ID to the password server; and a media password information updater operable to compare the update count of the password in the media password information received from the password server with the update count of the password in the media password information stored in the media password information provider with respect to the same media ID, and update the media password information stored in the password manager only for the recording medium which has the update count of the password received from the password server bigger than the update count of password stored in the media password information provider, and the password server comprises:

a data communicator operable to send/receive the media password information to/from the information recording device;

a device verifier operable to verify the information recording device via the data communicator, and according to the verification result, control the media password information to be exchanged between the password server and the information recording device;

an all password information manager operable to store media password information of all of the objective recording medium (media);

a media password information provider operable to output the media password information to the information recording device;

a media password information updater operable to compare the update count of the password in the media password information received from the information recording device with the update count of the password in the media password information in the all password information manager, and only when the update count of the password in the received media password information is bigger, update the media password information stored in the all password information manager.

In a third aspect of the present disclosure, an information recording device is provided.

The information recording device for controlling a recording medium, the recording medium being capable of limiting a function by password, includes:

a password manager operable to store media password information which associates a media ID specific to the recording medium with a password and the update count of the password;

a data communicator operable to send/receive the media password information;

a server verifier operable to verify a password server via the data communicator;

a limitation cancel requester operable to select media password information stored in the password manager with reference to the media ID and the update count of the password obtained from the recording medium and output the password recorded in the selected media password information in the recording medium in order to cause the password comparator of the recording medium to compare the passwords;

a password creator operable to create a new password;

a password setter operable to register the new password created in the password creator to the recording medium;

a media password information provider operable to send the new password which is set via the password setter, the update count of the password after setting the new password, and the media ID to the password server; and a media password information updater operable to compare the update count of the password in the media password information received from the password server with the update count of the password in the media password information stored in the media password information provider with respect to the same media ID, and update the media password information stored in the password manager only for the recording medium which has the update count of the password received from the password server bigger than the update count of password stored in the media password information provider.

According to the present disclosure, an information recording device, a recording medium, and an information recording system capable of allowing a user to avoid troublesomeness of password input while ensuring security in the case where a plurality of recording media belonging to different users is used in a single camera recorder, for example, can be provided.

BRIEF DESCRIPTION OF DRAWINGS

FIG. 3 is a diagram describing an example of command format output from an information recording device to a recording medium;

FIG. 4 is a table showing correspondence of function IDs to function names;

FIG. 6 is a table showing an example of correspondence of version information to password classifications;

FIG. 7A and FIG. 7B are tables showing relationship between password lists and version information;

FIG. 9A to FIG. 9C are tables for describing password information;

FIG. 12 is a flow chart describing an example of processing performed with the password server when the information recording device sets a new password to the recording medium.

DETAILED DESCRIPTION OF PREFERRED EMBODIMENT

Figure 1:
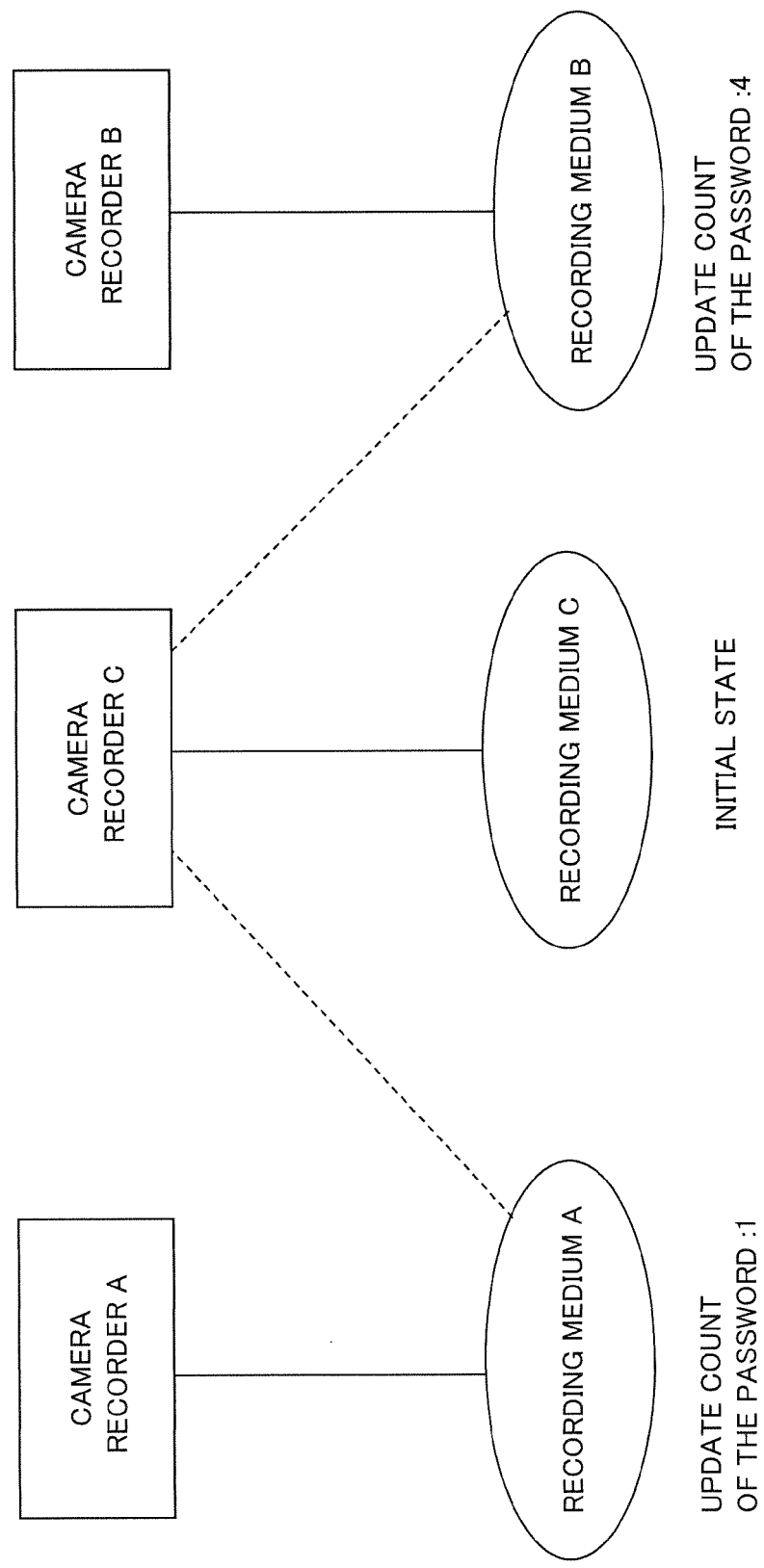
FIG. 1 is a diagram illustrating a use case of an information recording system.

Embodiments will be described below in detail with reference to the drawings as required. However, unnecessarily detailed description may be omitted. For example, detailed description of already known matters and redundant description of substantially the same configuration may be omitted. All of such omissions are for facilitating understanding by those skilled in the art by preventing the following description from becoming unnecessarily redundant.

The inventor(s) provide the attached drawings and the following description for those skilled in the art to fully understand the present disclosure and does not intend to limit the subject described in the claims by the attached drawings and the following description.

BACKGROUND OF THE PRESENT DISCLOSURE

As prices of flash memories are decreasing and as flash memories are becoming faster, memory cards are becoming to principally record moving images not only in the consumer appliances field but also in the field of audio-visual appliances for professional use.

The memory card is compact, light, and convenient, though, it is apt to be lost. The contents taken by a camera recorder for professional use contain such information as personal information and confidential information. Therefore, the memory card involves a high risk of contents leakage in case of loss of the memory card which contains the contents or in case of careless lending of the memory card to an outsider.

For that reason, it is demanded that the memory card has a function of preventing the taken contents from being reproduced in case of loss or in case of careless lending to an outsider.

As a technology for solving the problem, it has been known the technology called password lock by which a password is set to a memory card and when a password same as that set to the memory card is not input, access to the memory card is forbidden.

The password lock technology requires a user to input a password each time the memory card is powered on. However, in the professional use which requires the recording to instantly start after the power-on, the password input involves troublesomeness.

According to JP-A-2004-030581, a default input password is stored in the information recording device and an access security password is stored in the recording medium as described above. In the case where a password is not input by the user to use the recording medium in the information recording device, the default input password is compared with the access security password. When the default input password matches with the access security password, access limitation to the recording medium is canceled. As a result, the user is allowed to access the recording medium without inputting the password.

A user sometimes wants to share a camera recorder or a recording medium with a plurality of groups. That is the case particularly in the professional field.

However, in such a professional use of the camera recorder as sharing of a single camera recorder among a group of people or lending of a working camera recorder to another group for a predetermined period of time, the risk of the password leakage is higher than a personal use. Therefore, in the professional use, frequent change of the password is required.

However, when a newly bought recording medium is put to use or if a recording medium is not used for a long period of time in the case where a camera recorder or a recording medium is shared among a group of people, and thus, the password is frequently changed, various passwords may be in use. Particularly in the case where a recording medium has not been used as a regular recording medium but as an archive for a long period of time, the password of the recoding medium may be different from that of the other recording media by several generations.

In view of the above described circumstances, a conventional technique of saving a default input password in the device does not work enough in the case where a plurality of recording media are used with different passwords. A specific example will be described with reference to FIG. 1.

FIG. 1 is a diagram illustrating a use case of an information recording system. In FIG. 1, the recording media includes a recording medium A which has the update count of the password 1, a recording medium B which has the update count of the password 4, and a recording medium C which is just bought (initial state). The camera recorder includes a camera recorder a capable of using the recording medium A alone, a camera recorder b capable of using the recording medium B alone, and a camera recorder c capable of using the recording medium A, the recording medium B, and the recording medium C.

The camera recorder a exclusively uses the recording medium A. The camera recorder b exclusively uses the recording medium A and the recording medium B. The camera recorder c is newly bought with the recording medium C and is communally used by the users of the camera recorder a and the camera recorder b. In the camera recorder c, the three recording media of the recording medium A, the recording medium B, the recording medium C are used.

The operations in the case where passwords registered to the recording medium A, the recording medium B, and the recording medium C are registered to the camera recorder c will be described.

The three kinds of recording media are distinguished by the serial numbers of the recording media.

That is, the camera recorder detects the serial number of the recording medium, and, with reference to the detected serial number, determines the password of the recording medium.

However, when the current password of the recording medium A is changed by the camera recorder a, and the recording medium A is subsequently used in the camera recorder c, the password of the recording medium A which is registered to the camera recorder c differs from the password after the change.

In that case, the password of the recording medium A needs to be input via a soft keyboard or the like, which requires a significant time in inputting the password, thus, which puts the user in risk of missing a chance to shoot.

Moreover, even though a plurality of passwords including the initial password are registered to the camera recorder c, password comparing needs to be performed a plurality of times. However, in the case where the recording medium has the lock system which forbids the recording medium to accept the password when the passwords do not match, the above described method cannot be used.

Meanwhile, a technique of setting a large value to the number of trials for the password comparing in the lock system may be possible. However, although the technique may be available in the case where the change count of the password is small, as the change count increases, the time required to make trials for the password comparing also increases, growing the risk of missing a chance to shoot.

The present disclosure provides an information recording device, a recording medium, and an information recording system capable of simplifying the procedure of keeping security in such processing as changing of password in the case where the user uses a plurality of recording media to which a password for access restriction is set in a single camera recorder, for example. The information recording device, the recording medium, and the information recording system according to the present disclosure will be specifically described below.

First Embodiment

1. Configuration

Figure 2:
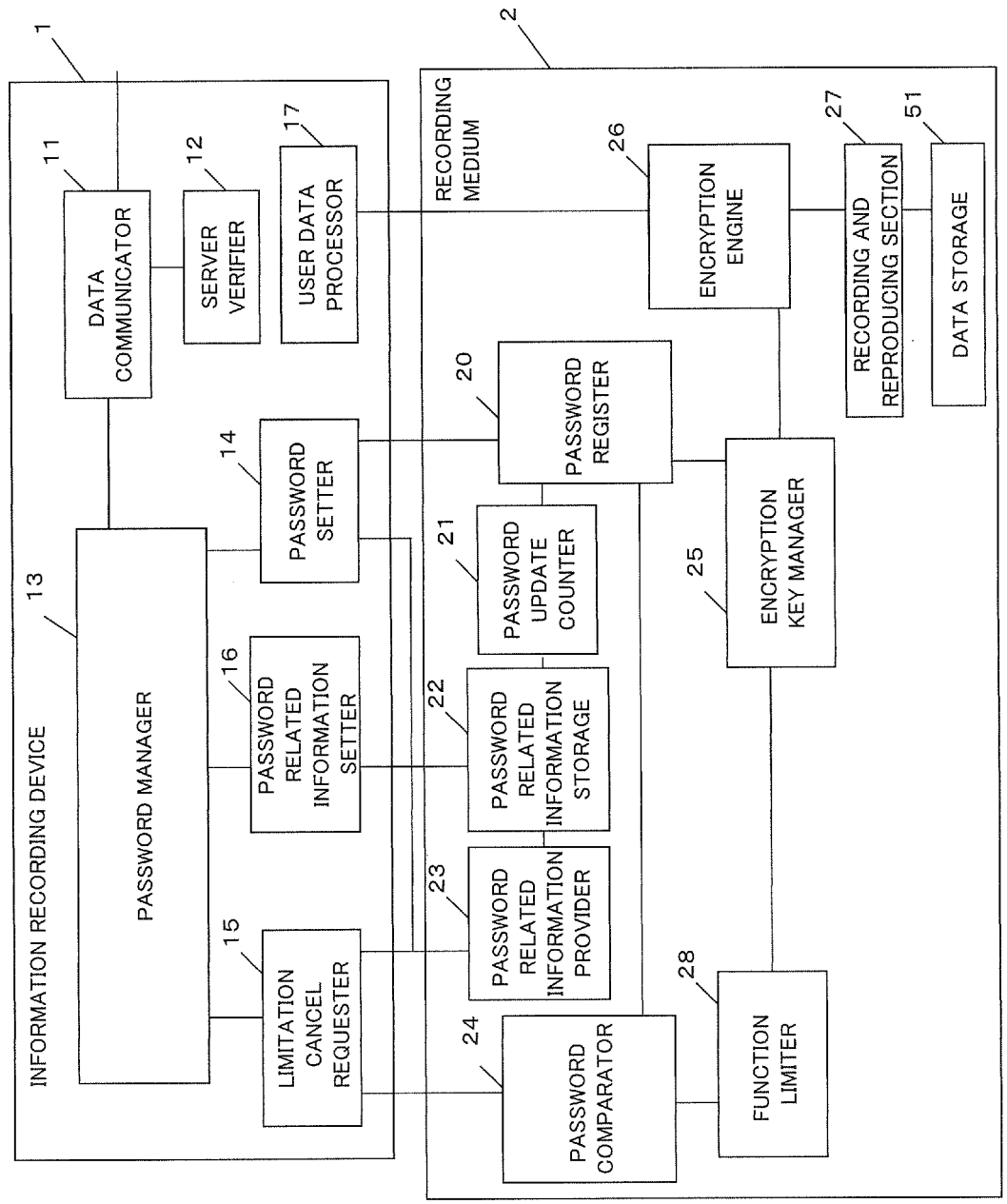
FIG. 2 is a block diagram illustrating a configuration of the information recording system according to a first embodiment.

FIG. 2 is a block diagram illustrating a configuration of the information recording system which has the recording medium and the information recording device according to the present disclosure. The information recording device according to the present embodiment is applied to a camera recorder. As illustrated in FIG. 2, the information recording system according to the present disclosure includes an information recording device 1 and a recording medium 2.

1-1. Configuration of the Information Recording Device

The information recording device 1 includes a data communicator 11, a server verifier 12, a password manager 13, a password setter 14, a limitation cancel requester 15, a password related information setter 16, and a user data processor 17.

The data communicator 11 is an interface with external equipment such as a password server. The data communicator 11 receives a password from, for example, a password server. The data communicator 11 is constituted of, for example, an Internet browser and a communication controlling section.

The server verifier 12 verifies the password server to ensure authenticity of the password received via the data communicator 11.

The password manager 13 stores (manages) the password input through the data communicator 11. When a plurality of recording media 2 are connected to the information recording device 1, the password manager 13 stores the password of the respective recording media 2.

The password setter 14 sets a predetermined password(s) among the passwords stored in the password manager 13 to the recording medium 2.

The limitation cancel requester 15 outputs to the recording medium 2 the password output from the password manager 15 and requests to cancel the limitation on use of a predetermined function among the functions of the recording medium 2.

The password related information setter 16 sets password related information including the update count of the password and version information of the password to the recording medium 2.

1-2. Configuration of the Recording Medium

The recording medium 2 includes a password register 20, a password update counter 21, a password related information storage 22, a password related information provider 23, a password comparator 24, an encryption key manager 25, an encryption engine 26, a recording and reproducing section 27, a function limiter 28, and a data storage.

The password register 20 stores an initial password at the time of factory shipment. When a password is sent from the password setter 14 of the information recording device 1, the password register 20 stores the sent password to replace the currently stored password.

The password update counter 21 counts the update count of the password. At the time of factory shipment, a hexadecimal "FFFF" is set to the password update counter 21 as the initial value of the update count. When a password sent from the password setter 14 is set to the password register 20 for the first time, the password update counter 21 sets the update count to 0, which is thereafter incremented by one each time the password is updated in the password register 20.

The password related information storage 22 stores the update count of the password which is counted by the password update counter 21. Also, the password related information storage 22 stores the version information of the password list (described later).

The password related information provider 23 sends the update count of the password and the version information of the password list which are stored in the password related information storage 22 to the recording medium 1 according to a request issued from the information recording device 1.

The password comparator 24 compares a password output from the limitation cancel requester 15 with the password stored in the password register 20.

The encryption key manager 25 generates a common encryption key for performing an encryption process and a decryption process on the content, and manages the generated common encryption key. The encryption key manager 25 generates the common encryption key at random regardless of the password itself. Then, the encryption key manager 25 stores (manages) the generated common encryption key.

The encryption engine 26 encrypts the user data output from the user data processor 17 of the information recording device 1 and outputs the encrypted user data to the recording and reproducing section 27. Also, the encryption engine 26 decrypts the encrypted data reproduced by the recording and reproducing section 27 and outputs the data generated by the decryption to the user data processor 17 of the information recording device 1.

The recording and reproducing section 27 records the user data encrypted by the encryption engine 26 in the data storage 51. Also, the recording and reproducing section 27 reproduces the encrypted data recorded in the data storage 51 and outputs it to the encryption engine 26.

The data storage 51 stores various types of data including the user data. The data storage 51 is made up of a nonvolatile memory, a hard disk drive (HDD), and the like, for example.

The function limiter 28 puts a limit on use of the function of the recording medium 2 for the information recording device 1. Specifically, the function limiter 28 puts a limit on use of the function of the encryption key manager 25 for the information recording device 1. When the result of comparing the passwords by the password comparator 24 shows that the passwords match, the function limiter 28 cancels the limitation on use of the function of the recording medium 2, and when the result shows that the passwords unmatch, the function limiter 26 does not cancel the limitation on use of the function of the recording medium 2. Therefore, when the passwords unmatch, the information recording device 1 can neither read the content which is stored in the recording medium 2 nor record the user data output from the user data processor 17 of the information recording device 1 to the recording medium 2.

1-3. Command

FIG. 3 is a diagram describing an example of command format output from the information recording device to the recording medium according to the present disclosure. The command includes a function ID, an identification ID, a new password after change, and the current password (old password). The function ID, the identification ID, the new password, and the old password have the amounts of information of 1 Byte, 1 Byte, 16 Byte, and 16 Byte, respectively. The identification ID, the new password, and the old password may not accompany some kinds of function IDs.

FIG. 4 is an illustration of function IDs related to passwords. In the present embodiment, "00000001", "00000010", "00000100", "00001000" are set as the function IDs. The function IDs "00000001", "00000010", "00000100", "00001000" correspond to a password setting function, a password clearing function, a password changing function, and a password version information setting function, respectively.

The identification ID is registered with the password in setting the password in order to distinguish a group to which the password is adapted.

The identification ID is stored in the password related information storage 22 of the recording medium 2, the stored identification ID is recorded the information recording device 1 via the password related information provider 23.

Figure 5:
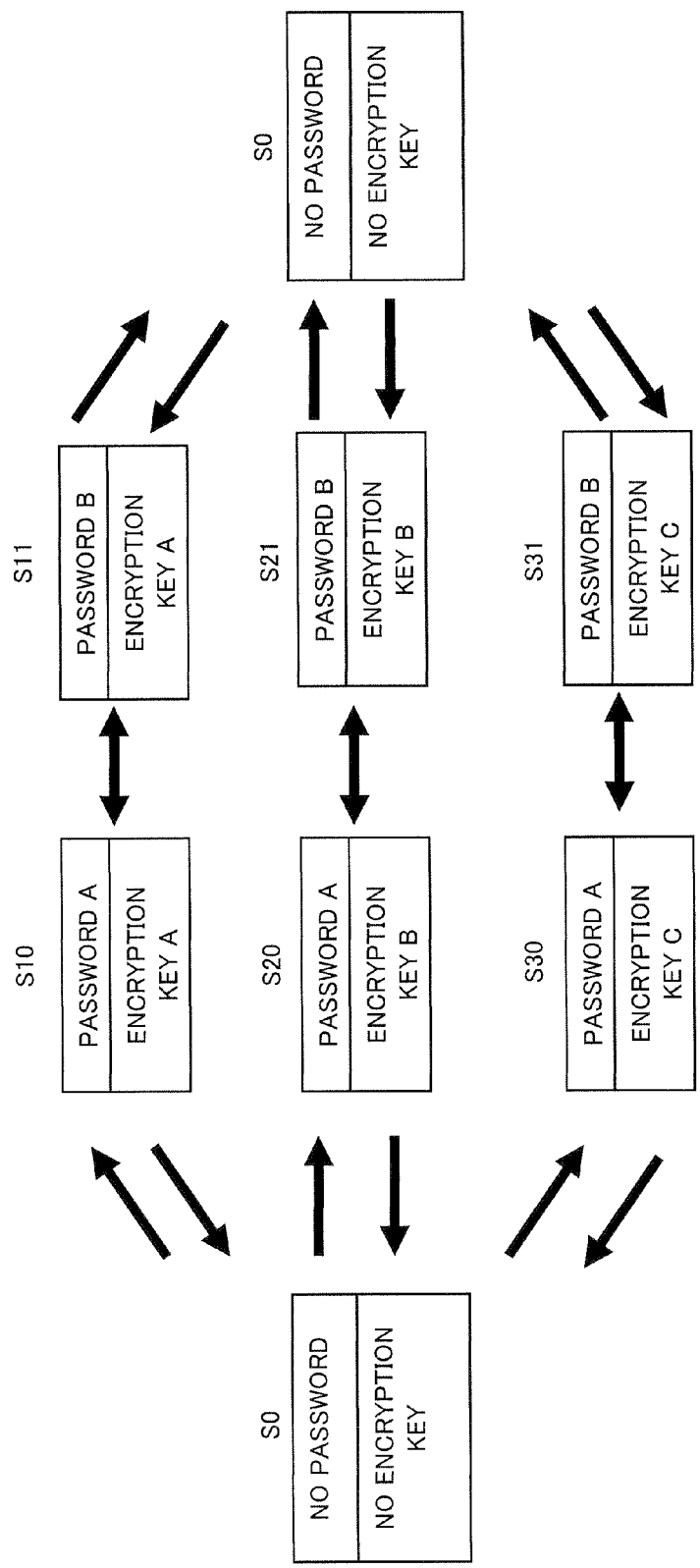
FIG. 5 is a diagram illustrating an example of state transition of passwords and encryption keys.

FIG. 5 is an illustration of state transition of passwords and encryption keys. The state S0 indicates a state in which the password is cleared and the encryption key is also cleared. It is possible to change any of the other states to the state S0 by issuing a command with the password clearing function ID added. In the password clearing command, any of the identification ID, the new password, and the old password needs not to accompany the function ID.

When a command with the password setting function ID added (password setting command) is issued in the state S0, an encryption key is generated and the state changes to the state other than the state S0 (S10, S20, S30, S11, S21, S31). In the password setting command, the identification ID and the new password accompany the function ID.

When a command with the password clearing function ID added (password clearing command) is issued in the state other than the state S0 (S10, S20, S30, S11, S21, S31), the state changes to the state S0 in which the password and the encryption key are cleared.

The states (S10, S20, S30) have the same password A and different encryption keys. The states S10, S20, S30 have an encryption key A, an encryption key B, an encryption key C, respectively. The states (S11, S21, S31) have the same password B and different encryption keys.

In order to change the password without changing the encryption key, a command with the password changing function ID added (password changing command) is issued in the state other than the state S0 in which the password and the encryption key are present. In the password changing command, the identification ID, the new password, and the old password accompany the function ID.

For example, when the password changing command is issued in the state S10, the state is enabled to be changed to the state S20 in which only the password is changed from the password A to the password B with the encryption key A left unchanged.

Further, when the version of the password changes as the password changes, the function ID "00001000" command is issued, therefore, the version information of the password is changed.

As described above, in the present embodiment, the encryption key does not change even though the password is changed. Therefore, it is also possible to change the password in the manner that the password registered in the information recording device 1 is issued to the recording medium 2, and in the recording medium 2, the issued password is compared with the password in the recording medium 2, and then the recording is started, and after the recording is started, a new password is input from the information recording device 1 to change the password.

1-4. Specific Example of Version Information

FIG. 6 is a table showing an example of correspondence of the version information to password classifications.

The version information is 8 bits. The version information "00000000" indicates that the version of the password is 0. That is, the version information "00000000" indicates that the password is the initial password of factory default. The version information "11111111" is a reserved word and 254 of "00000001" to "11111110" are allocated as the version information of the password.

The version information is used for the purpose of distinguishing the version of the password list which is associated with the lower bits of the update count of the password.

The version information "00000001" indicates that the version of the password is the password version 1, the version information "00000010" indicates that the version of the password is the password version 2, and the version information "00000011" indicates that the version of the password is the password version 3.

In the recording medium in the ex-factory condition, the initial password is set to the password register 29. When the recording medium 2 is used for the first time, the information recording device 1 connects to a password sever via a network by the data communicator 11 to obtain the password list (described later). When the information recording device 1 obtains the password list, it changes the version information to "00000001".

(Relationship Between Password Lists and Version Information)

FIG. 7A and FIG. 7B are tables showing relationship between password lists and version information. FIG. 7A shows the password list of the password version 1, and FIG. 7B shows the password list of the password version 2. As for the password version 3 and later, a password list is also provided for each version.

The lower 3 bits of the update count of the password and the corresponding password are described in each password list.

As such, the password manager 13 stores the password list corresponding to the version information. That is, the password manager 13 uses the version information and the lower 3 bits of the update count of the password as the password identification ID to uniquely manage the correspondence between the password identification ID and the password.

More specifically, when the version information obtained from the password related information provider 23 of the recording medium 2 is 1 and the update count of the password is 1, the password manager 13 estimates that the password stored in the recording medium 2 is the password "AAB3" shown on line two of FIG. 7A. When the version information obtained from the password related information provider 23 of the recording medium 2 is 2 and the update count of the password is 4, the password manager 13 estimates that the password stored in the recording medium 2 is the password "B9A7" shown on line five of FIG. 7B.

Only the lower bits of the password are included in the password list because the difference in the update count of the password is big between the password of the recording medium 2 which has been used for a long time and the password of the newly bought recording medium 2. Otherwise, specifically in the case where the password is changed every week and the update count of the password which has been used for five years is about 250 and the update count of the password of the newly bought recording medium 2 is 0, 250 or more passwords need to be stored in the password manager 13 of the information recording device 1.

When the password of the recording medium 2 is uniquely decided with respect to the update count of the password, the password is liable to leakage if it is used for a long time, which is unfavorable in terms of security. On the other hand, when it is tried to make the password of the newly bought recording medium 2 same as the password of the existing recording medium 2, the password needs to be changed as much as around 250 times, which is impractical.

In order to solve these problems, the password lists may be periodically updated and the password lists of the latest version may be used. In that case, the password which is associated with the lower bits of the update count of the password may be used to register the password.

In registering a password, the update count which is found by adding 1 to the lower three bits of the update count of the password obtained from the recording medium 2 is compared with the password list. When the lower three bits of the update count of the password obtained from the recording medium 2 is "111", the update count found by adding 1 to the lower three bits is "000".

When it is desired to make the password of the newly obtained recording medium 2 same as the password of the existing recording medium 2, changing of the password may be repeated in the newly obtained recording medium 2. For example, in order to bring the lower three bits of the update count of the password to 4 or more in the newly obtained recording medium 2, password changing may be performed on the initial password stored in the newly obtained recording medium 2 for five times according to the password list.

In the recording medium 2 of the present embodiment, even if the password is changed, the encryption key is kept. Thus, the password may be changed at any time without limitation.

Although the password list records eight passwords in the present embodiment, the password(s) not less than eight or not more than eight may be recorded. The number of passwords recorded in the password list may be set according to the update frequency of the password.

When the password list including the passwords by the number of the update count bigger than eight is set as the password list at the time of factory shipment, the requirement of obtaining the password of another version via a network decreases.

As described above, the information recording device 1 obtains the update count of the password of the recording medium 2 from the recording medium 2 which stores the update count of the password, and selects a predetermined password from among the passwords recorded in the password list which is stored in the information recording device 1 to issue the password for comparing the passwords.

When the information recording device 1 changes the password, it selects the password of the update count, which is found by adding 1 to the obtained update count of the password, from the password list and sets the password to the recording medium 2.

As a result, even though the information recording device 1 receives the recording medium 2, the password of which has been changed in another information recording device 1, it can uniquely decide the password of the recording medium 2 based on the update count of the password obtained from the recording medium 2. Therefore, there is a small likelihood that the passwords unmatch.

When the information recording device 1 updates the password of the recording medium 2, it selects from the password manager 13 the password of the password identification ID corresponding to the update count which is found by adding 1 to the update count of the password obtained from the recording medium 2, and sets the password to the recording medium 2. As a result, the information recording device 1 can continuously maintain the relationship between the update count of the password and the password identification ID. As a result, comparing of passwords and updating of the password can be automated. Therefore, the time required for these processes can be drastically decreased.

By repeating changing of the password in the newly obtained recording medium 2, the password of the newly obtained recording medium 2 can be made same as the password of the existing recording medium 2. That can eliminate the risk to security led by the use of an old password in the newly obtained recording medium 2.

When a new password is added, the version information for distinguishing a group of previously stored passwords from a group of added passwords is added to the password manager 13 so that only the passwords of the new version are used. That can eliminate the security risk led by the use of an old password. In addition, that can reduce the number of passwords being managed.

Further, the password is set with the version information and the lower bits of the update count of the password as reference parameters. With that setting, when the update count of the password of the newly bought recording medium 2 is made match with the lower bits of the update count of the password of the existing recording medium 2 according to the password list of the same version information, the password of the newly bought recording medium 2 can be made same as the password of the existing recording medium 2. Only the lower bits needed to be compared in the password comparing, the time required to update the password can be stored more than the case where the all bits are compared.

1-5. Effects and the Like

As described above, the information recording system of the present embodiment is an information recording system including a recording medium 2 capable of limiting a function by password and an information recording device 1 for controlling the recording medium 2, wherein the recording medium 2 includes:

a password register 20 for saving an input password;

a password update counter 21 for counting the updating event(s) of a password, the password being stored in the password register 20;

a password related information storage 22 for storing the update count of the password;

a password related information provider 23 for outputting information stored in the password related information storage 22 in response to a READ request issued from the information recording device 1;

a password comparator 24 for comparing a input password with a password stored in the password register 20; and a function limiter 28 for limiting a predetermined function of the recording medium 2 according to the comparison result from the password comparator 24, and the information recording device 1 includes:

a password manager 13 for saving a password and a password identification ID which is associated with the update count of the password; and a limitation cancel requester 15 for selecting a password stored in the password manager 13 with reference to the update count of the password and the password identification ID output from the password related information provider 23 and inputting the selected password into the recording medium 2 in order to cause the password comparator 24 of the recording medium 2 to compare the passwords.

With the above described configuration, the information recording device 1 can select an appropriate password from among the stored passwords with reference to the update count of the password and the password identification ID of the recording medium 2 output from the recording medium 2 and output the selected password to the recording medium 2. Therefore, even when the recording medium 2 for use in the information recording device 1 is changed, the information recording device 1 can output an appropriate password to the recording medium 2.

As a result, when a plurality of recording media 2 belonging to different users is used in a single camera recorder, for example, the present embodiment allows the user to avoid troublesomeness of password input while ensuring security.

In the present embodiment, the information recording device 1 further includes a password setter 14, and when the password is updated, the password setter 14 adds 1 to the update count of the password output from the password related information provider 23 and stores the password associated with the update count obtained by the addition in the password register 20 of the recording medium 2.

With this configuration, when the password is updated, the update count of the password and the password associated with the update count obtained by the addition can be simultaneously registered in the recording medium 2.

In the present embodiment, the password manager 13 stores a plurality of passwords and a plurality of password identification IDs at the time of factory shipment.

With this configuration, stronger security than the case where only one password is saved at the time of factory shipment is ensured.

In the present embodiment, the password setter 14 sets the password to the password register 20 for a plurality of times with reference to the update count of the password provided by the password related information provider 23 until the password becomes the password corresponding to a desired update count when the password of the recording medium 2 is updated.

With this configuration, the update count of the password of the recording medium 2 can be easily made same as the update count of the password provided from the password related information provider 23.

In the present embodiment, the recording medium 2 further includes a password related information setter 16, the password manager 13 stores a password list and version information of the password list, the password list saving a plurality of passwords associated with the update counts, the password related information setter 16 sets version information of the password to the password related information storage 22, the password being set by the password setter 14 to the recording medium 2, and the limitation cancel requester 15 selects a predetermined password from among the plurality of passwords stored in the password manager 13 with reference to the update count of the password and the version information provided from the password related information provider 23.

With this configuration, the present embodiment can update the password list itself which stores a plurality of passwords associated with the update counts. Therefore, the present embodiment can further enhance security.

In the present embodiment, the password identification ID is equal to the lower N bits (N is a natural number) of the update count of the password.

With this configuration, easy setting of the password identification ID is enabled.

The recording medium 2 of the present embodiment includes:

a password register 20 for saving an input password;

a password update counter 21 for counting the updating event(s) of a password, the password being stored in the password register 20;

a password related information storage 22 for storing the update count of the password;

a password related information provider 23 for providing information stored in the password related information storage 22 in response to a READ request issued from the information recording device 1;

a password comparator 24 for comparing a password stored in the password register 20 with a password input; and a function limiter 28 for limiting a predetermined function of the recording medium 2 according to the comparison result from the password comparator 24.

With this configuration, when a plurality of recording media 2 belonging to different users is used in a single camera recorder, for example, the present embodiment allows the user to avoid troublesomeness of password input while ensuring security.

Second Embodiment 2-1. Configuration

In the first embodiment, the password sent from the password managing server is used as the password of the recording medium 2, the present embodiment provides the information recording device 1 with a password inputter 10 for a user to input a password and uses the password input by the user as the password of the recording medium 2.

Figure 8:
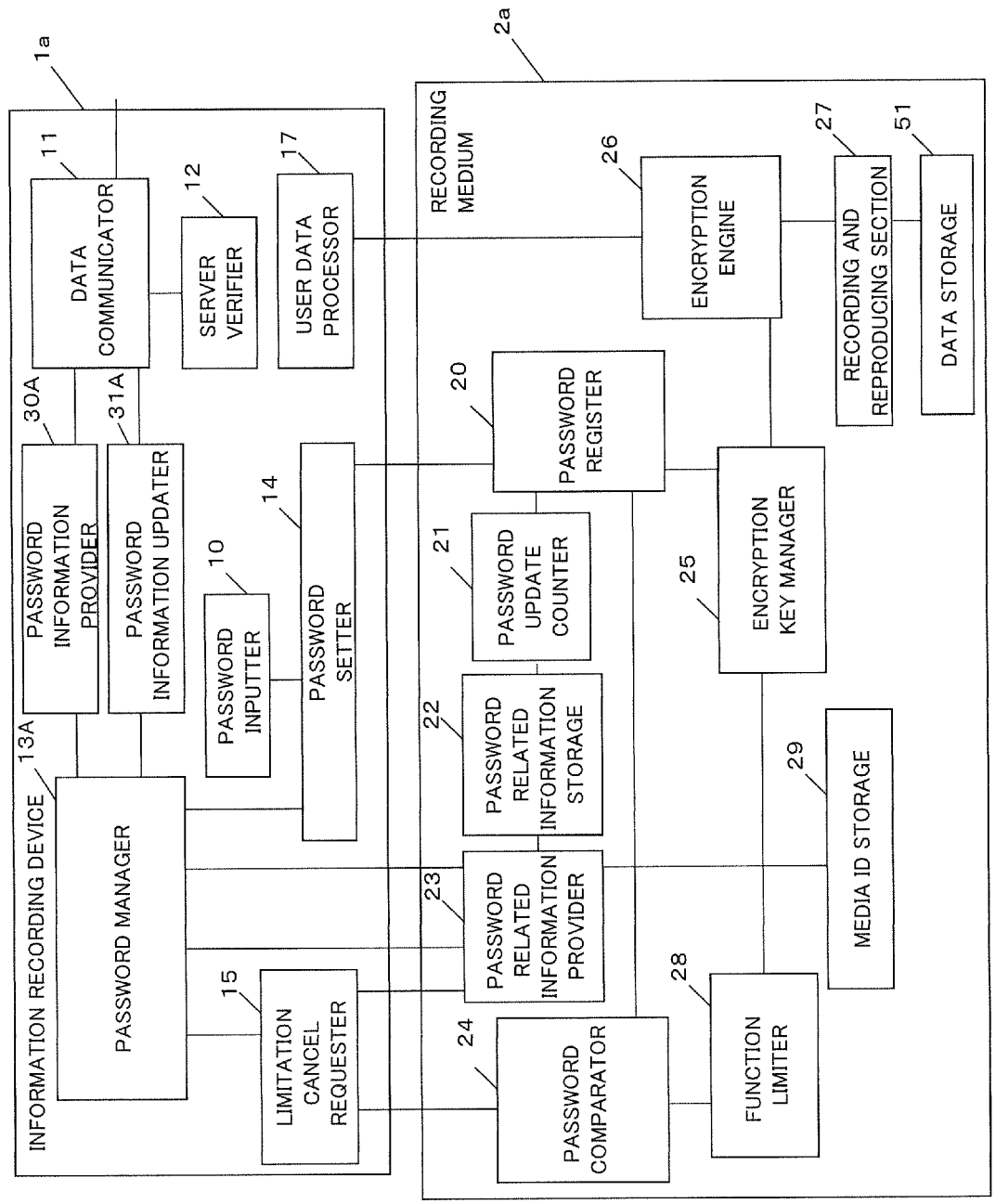
FIG. 8 is a block diagram illustrating a configuration of the information recording system according to a second embodiment.

FIG. 8 is a block diagram illustrating a configuration of the information recording system according to the present embodiment. As illustrated in FIG. 8, the information recording system according to the present embodiment includes an information recording device 1a and a recording medium 2a.

Similar to the first embodiment, the information recording system according to the present embodiment controls the encryption engine of the recording medium 2a by a password issued by the information recording device 1a so that data encrypted before recording cannot be decoded when the passwords match. As a result, the present embodiment can maintain security of the recording medium 2a. The information recording system according to the present embodiment will be described in detail below.

First, a configuration of the recording medium 2a will be described with reference to FIG. 8.

The recording medium 2a of the present embodiment includes a media ID storage 29 in addition to the configuration of the recording medium 2 of the first embodiment. The media ID storage 29 can use a serial number, for example, as a media ID which is a distinguishing parameter of the recording medium 2. In FIG. 8, the information recording device 1*a* associates the media ID with the update count of the password which is read out from the password related information provider 23 of the recording medium 2 for management. Since the other parts of the configuration are the same as those of the first embodiment, they are omitted from the description.

Now, the configuration of the information recording device 1*a* will be described with reference to FIG. 8.

The information recording device 1*a* of the present embodiment includes the password inputter 10, a media password information provider 30*a*, and a media password information updater 31*a* in addition to the configuration of the information recording device 1 of the first embodiment. On the other hand, the information recording device 1*a* of the present embodiment does not have the password related information setter 16 of the information recording device 1 of the first embodiment.

The password inputter 10 is an operational interface for a user of the recording medium 2*a* to create and input a password of the recording medium 2*a*. The password inputter 10 may be constituted of a touch panel, a keyboard or the like.

The password manager 13*a* of the present embodiment associates the media ID of the recording medium 2*a* with the update count of the password and the password of the recording medium 2*a* and stores (manages) them.

The password manager 13*a* stores (manages) the password information below.

(Type 1) The password information of the recording medium 2*a* set by the information recording device 1*a*

(Type 2) The password information obtained from the password server 4 which manages passwords The password information of (Type 1) is the information of the password information of (Type 2) which is obtained by the information recording device 1*a* and recorded therein, and is recorded only in the information recording device 1*a*.

The media password information provider 30*a* registers the password information of (Type 1) to the server via the data communicator 11.

The media password information updater 31*a* obtains the password information of (Type 2) via the data communicator 11.

The operation of the password manager 13*a* will be described with reference to FIG. 9A to FIG. 9C. FIG. 9A to FIG. 9C are tables showing an example of the password list managed by the password manager 13*a*. Specifically, FIG. 9A is a password list which records the password information obtained via the media password information updater 31*a* and is equivalent to the password list which records the password information of (Type 2). FIG. 9B is a password list which records the password information set by the information recording device 1*a* and is equivalent to the password list which records the password information of (Type 1). FIG. 9C is a password list which records the password information obtained via the media password information updater 31*a* at a certain period of time after the password information of FIG. 9A is obtained.

Four recording media 2*a* are registered to the password list of FIG. 9A. Specifically, in this example, information of the password and the update count of the password is recorded respectively in the four recording media 2*a* which have the media IDs of "0000", "0001", "0010", "0011".

In the password list of FIG. 9B, the password of the recording medium 2*a* of the media ID "0000" in the password list of FIG. 9A, i.e. "AAA1", is changed to "NAAF" and the password of the recording medium 2*a* of the media ID "0010", i.e. "BBA4", is changed twice to be In the password list of FIG. 9C, the update count of the password of the recording medium 2*a* of the media ID "0000" has been incremented twice from "001" to be "011" in FIG. 9A. This indicates that the password of the recording medium 2*a* of the media ID "0000" is updated by a different information recording device from the different information recording device of which password is "NAAF". The state occurs in the case that a user who set a password in the recording medium updates the password of the same recording medium by a different information recording device from the information recording device of which password is set.

The operation of the password manager 13*a* will be described in the case where the password manager 13*a* obtains the password list of FIG. 9C via the media password information updater 31*a* while managing the password lists (password information) shown in FIG. 9A and FIG. 9B.

When the update count of the password of the recording medium 2*a* of the media ID "0000" is compared between the password list of FIG. 9B and the password list of FIG. 9C, the update count of the password in the password list of FIG. 9C is bigger. When the update count of the password of the recording medium 2*a* of the media ID "0010" is compared, the update count of the password in the password list of FIG. 9B is bigger.

In that case, the information recording device 1*a* determines that after the password of the recording medium 2*a* of the media ID "0000" is changed in the information recording device 1*a*, the password of the recording medium 2*a* of the media ID "0000" is changed again in other information recording device 1*a*.

Then, the password manager 13*a* of the information recording device 1*a* deletes the password of the recording medium 2*a* of the media ID "0000" in the password list of FIG. 9B, and changes the password information of the recording medium 2*a* of the media ID "0000" in the password list of FIG. 9A to the update count of the password and the password of the recording medium 2*a* of the media ID "0000" in the password list shown in FIG. 9C.

The operation of the password manager 13*a* will be described in the case where the password manager 13*a* sends the updated password information of FIG. 9B to the password server via the media password information provider 30*a* and the data communicator 11.

Figure 10:
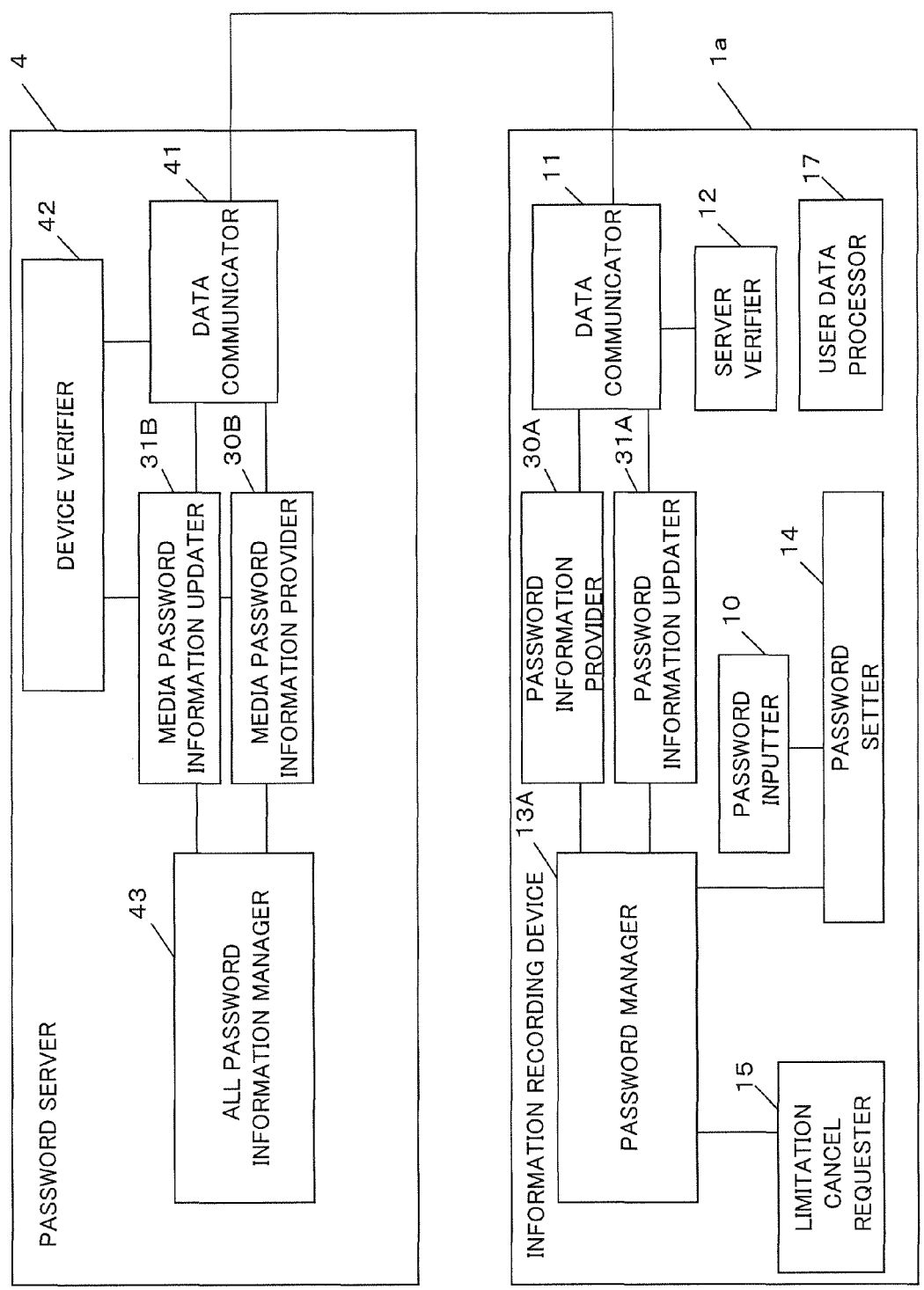
FIG. 10 is a block diagram illustrating a configuration of the information recording device and a password server according to the second embodiment.

FIG. 10 is a block diagram illustrating a configuration of the password server 4 connected to the information recording device 1*a* according to the second embodiment.

Since the information recording device 1*a* is same as the information recording device 1 in FIG. 8, it is omitted from the description.

The password server 4 includes a data communicator 41, a media password information provider 30*b*, a media password information updater 31*b*, a device verifier 42, and all password information manager 43. The password server 4 manages the password information of the recording medium 2*a* sent from the information recording device 1*a*, and sends/receives the password information to/from a plurality of information recording devices 1*a*.

The data communicator 41 sends/receives the password information to/from the information recording devices 1*a*. The device verifier 42 verifies the information recording device 1*a* with which the password information is exchanged. Further, the device verifier 42 makes a sharp distinction between the password information to be exchanged and the others.

The all password information manager 43 manages the password information of the recording medium sent from the information recording device 1a.

The media password information provider 30b sends the password information managed in the all password information manager 43 to the information recording device 1 via the data communicator 11 according to the verification result from the device verifier 42.

The media password information updater 31b determines whether or not to cause the all password information manager 43 to reflect the password information of the information recording device 1a received via the data communicator 11.

The password information received by the media password information updater 31b is the information on the password set in the information recording device 1a as exemplified in FIG. 9B.

The operation will be described below in the case where the password information shown in FIG. 9B is input to the media password information updater 3, and the password information in the all password information manager 43 is the information as shown in FIG. 9C at the input moment.

When the update count of the password of the recording medium 2a of the media ID "0000" is compared between the password list of FIG. 9B and the password list of FIG. 9C, the update count of the password in FIG. 9C is bigger. When the update count of the password of the recording medium 2a of the media ID "0010" is compared, the update count of the password in the password list of FIG. 9B is bigger.

In that case, the information recording device 1a which is currently exchanging the password with the password server 4 determines that after the password of the recording medium 2a of the media ID "0000" is changed in the current information recording device 1a, the password of the recording medium 2a of the media ID "0000" is changed again in another information recording device 1a, and the latter information recording device 1a sends the password information to the password server 4 prior to the current information recording device 1a.

At that time, the media password information updater 31b of the password server 4 does not transfer the password information of the recording medium 2a of the media ID "0000" (FIG. 9B) to the all password information manager 43.

Also at that time, it can be determined that the information recording device 1a which is currently exchanging the password with the password server 4 has the latest password information of the recording medium 2a of the media ID "0010". Therefore, the password information of the recording medium 2a of the media ID "0010" (FIG. 9B) is transferred to the all password information manager 43.

With that management of the media ID and the update count of the password of the recording medium 2a, even in the case where a single recording medium 2a is used by a plurality of information recording devices 1a and the password of the recording medium 2a is changed, the password kept by the respective information recording devices 1a and the password server 4 can be correctly managed.

It is also possible that the password created by a person is set to the recording medium 2a via the information recording device 1a, and after the password is registered to the password server 4, the password is provided for the other verified information recording devices 1a via the password server 4. That enables the password which is different for each recording medium 2a to be created and, if necessary, changed.

Figure 11:
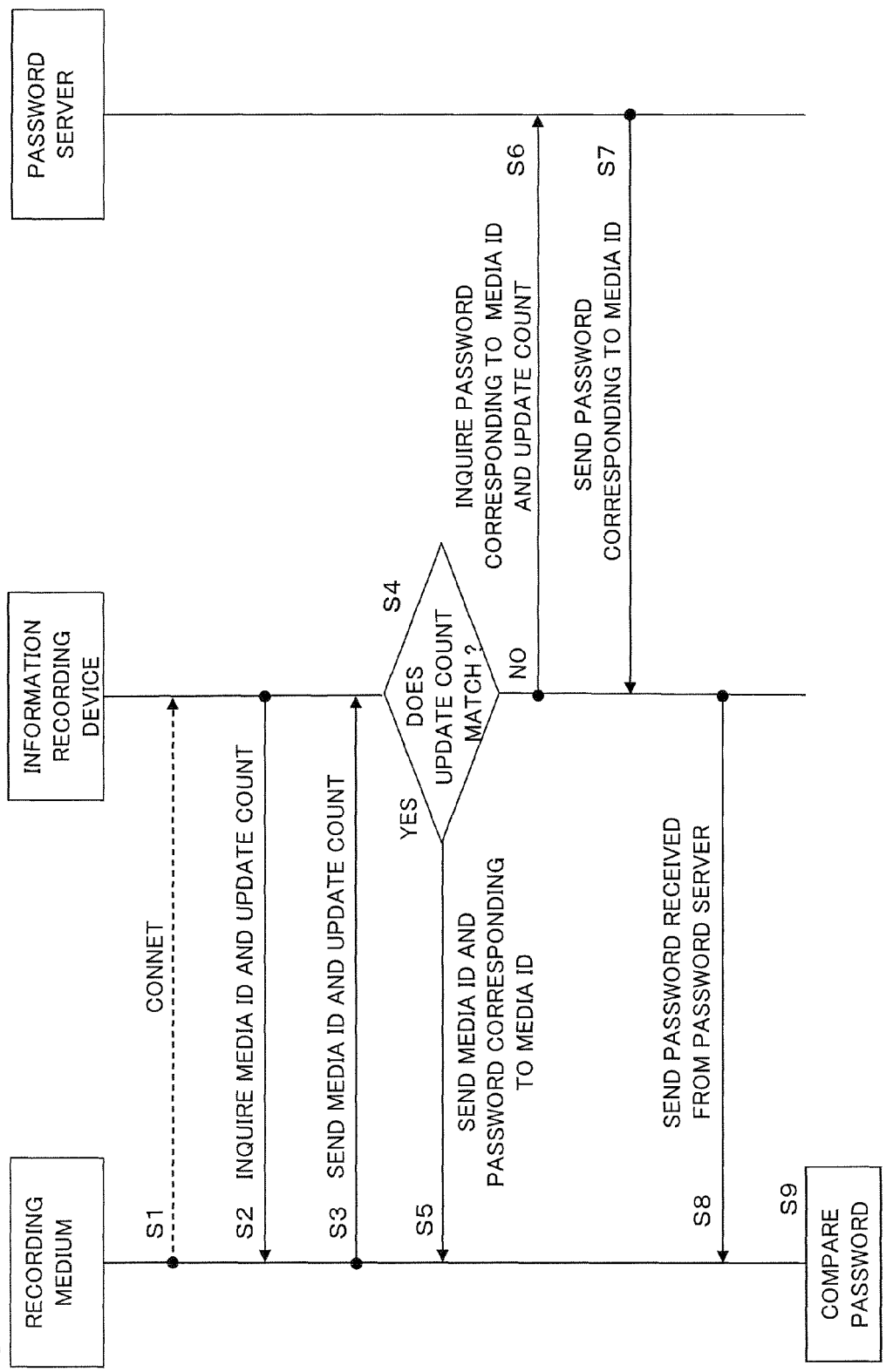
FIG. 11 is a flow chart describing an example of processing performed with the password server when the recording medium is connected to the information recording device.

FIG. 11 is a flow chart describing an example of processing performed with the password server 4 when the recording medium 2a is connected to the information recording device 1a.

When the recording medium 2 is connected to the information recording device 1a (S1), the information recording device 1a inquires the media ID and the update count of the recording medium 2a from the recording medium 2a (S2). The recording medium 2a sends the media ID and the update count of the recording medium 2a to the information recording device 1a (S3). The information recording device 1a determines whether the update count of media ID received from the recording medium 2a matches with the update count of recording medium 2a recorded in the password list (S4). When it matches with the update count of the recording medium 2a recorded in the password list, the information recording device 1a sends the password corresponding to the media ID received from the recording medium 2a among the passwords recorded in the password list to the recording medium 2a (S5). On the other hand, when it does not match with the update count of the recording medium 2a recorded in the password list, the information recording device 1a inquires of the password server 4 the password corresponding to the media ID and the update count received from the recording medium 2a (S6). The password server 4 sends the password corresponding to the media ID and the update count to the information recording device 1a (S7). The information recording device 1a sends the password received from the password server 4 to the recording medium 2a (S8). The recording medium 2a performs comparison on the password received from the information recording device 1a (S9).

FIG. 12 is a flow chart describing an example of processing performed with the password server 4 when the information recording device 1a performs password changing on the recording medium 2a, that is, when a new password is set.

When the information recording device 1a sets a new password to the recording medium 2a (S11), it sends the media ID, the new password, and the update count of the recording medium 2a to the password server 4 (S12). The password server 4 performs updating by using the received password corresponding to the media ID and the update count (S13).

2-2. Effects and the Like

As described above, the information recording system according to the second embodiment is an information recording system including a recording medium 2a capable of limiting a function by password and an information recording device 1a for controlling the recording medium 2a, wherein the recording medium 2a includes:

a password register 20 for saving an input password;

a password update counter 21 for counting the updating event(s) of a password, the password being stored in the password register 20;

a password related information storage 22 for storing the update count of the password;

a password related information provider 23 for providing information stored in the password related information storage 22 in response to a READ request issued from the information recording device 1a;

a media ID storage 29 for storing a media ID specific to the recording medium 2a;

a password comparator 24 for comparing a input password with a password stored in the password register 20; and a function limiter 28 for limiting a predetermined function of the recording medium 2a according to the comparison result from the password comparator 24, and the information recording device 1a includes:

a password manager 13a for saving media password information which associates the media ID with a password and the update count of the password; and a limitation cancel requester 15 for selecting a password stored in the password manager 13a with reference to the media ID and the update count of the password obtained from the recording medium 2a and inputting the selected password in the recording medium 2a in order to cause the password comparator 24 of the recording medium 2a to compare the passwords;

a password inputter 10 for creating a new password; and a password setter 14 for registering the new password created in the password inputter 10 to the password register 20 of the recording medium 2a.

The information recording system of the present embodiment is an information recording system including an information recording device 1a for controlling a recording medium 2a which is capable of limiting a function by password and a password server 4 for managing the password, wherein the information recording device 1a includes:

a password manager 13a for saving media password information which associates a media ID specific to the recording medium 2a with a password and the update count of the password;

a limitation cancel requester 15 for selecting a password stored in the password manager 13a with reference to the media ID and the update count of the password obtained from the recording medium 2a and inputting the selected password in the recording medium 2a in order to cause the password comparator 24 of the recording medium 2a to compare the passwords;

a password inputter 10 for creating a new password;

a password setter 14 for registering the new password created in the password inputter 10 to the password register 20 of the recording medium 2a;

a data communicator 11 for sending/receiving the media password information;

a server verifier 12 for verifying the password server 4 via the data communicator 11;

a media password information provider 30a for sending the new password, the update count of the password after setting the new password, and the media ID to the password server 4; and a media password information updater 31b for comparing the update count of the password in the media password information received from the password server 4 with the update count of the password in the media password information stored in the media password information provider 30a with respect to the same media ID, and updating the media password information stored in the password manager 13a only for the recording medium 2a which has the update count of the password received from the password server 4 bigger than the update count of password stored in the media password information provider 30a, and the password server 4 includes:

a data communicator 11 for sending/receiving the media password information to/from the information recording device 1a;

a device verifier 42 for verifying the information recording device 1a via the data communicator 11, and according to the verification result, controlling the media password information to be exchanged between the password server 4 and the information recording device 1a;

an all password information manager 43 for saving media password information of all of the recording medium (media) 2a covered;

a media password information provider 30a for outputting the media password information to the information recording device 1a; and a media password information updater 31b for comparing the update count of the password in the media password information received from the information recording device 1a with the update count of the password in the media password information in the all password information manager 43, and only when the update count of the password in the received media password information is bigger, updating the media password information stored in the all password information manager 43.

The information recording device 1a of the present embodiment is an information recording device 1a for controlling a recording medium 2a, the recording medium 2a being capable of limiting a function by password, including:

a password manager 13a for saving media password information which associates a media ID specific to the recording medium 2a with a password and the update count of the password;

a data communicator 11 for sending/receiving the media password information;

a server verifier 12 for verifying the password server 4 via the data communicator 11;

a limitation cancel requester 15 for selecting media password information stored in the password manager 13a with reference to the media ID and the update count of the password obtained from the recording medium 2a and inputting the password recorded in the selected media password information in the recording medium 2a in order to cause the password comparator 24 of the recording medium 2a to compare the passwords;

a password inputter 10 for creating a new password;

a password setter 14 for registering the new password created in the password inputter 10 to the recording medium 2a;

a media password information provider 30a for sending the new password which is set via the password setter 14, the update count of the password after setting the new password, and the media ID to the password server 4; and a media password information updater 31b for comparing the update count of the password in the media password information received from the password server 4 with the update count of the password in the media password information stored in the media password information provider 30a with respect to the same media ID, and updating the media password information stored in the password manager 13a only for the recording medium 2a which has the update count of the password received from the password server 4 bigger than the update count of password stored in the media password information provider 30a.

With the above described configuration, the information recording device 1 can select an appropriate password from among the stored passwords with reference to the media ID of the recording medium 2 and the update count of the password output from the recording medium 2 and output the selected password to the recording medium 2. Therefore, even when the recording medium 2 for use in the information recording device 1 is changed, the information recording device 1 can output an appropriate password to the recording medium 2.

As a result, an information recording device 1a, a recording medium 2a, and an information recording system capable of allowing a user to avoid troublesomeness of password input while ensuring security in the case where a plurality of recording media 2a belonging to different users is used in a single camera recorder, for example, can be provided.

Other Embodiments

The data communicator 11, the server verifier 12, the password setter 14, the limitation cancel requester 15, the password related information setter 16, and the user data processor 17 constituting the information recording device 1 of the first embodiment may be implemented by such a semiconductor processor as LSI. In that case, these constituent elements may be separately made into individual chips or may be made into a chip which includes some or all of the constituent elements. The password manager 13 may be implemented by a semiconductor memory. The above described semiconductor processor and the semiconductor memory may be made into a chip. The data storage 51 may be used as the semiconductor memory.

The password update counter 21, the password related information provider 23, the password comparator 24, the encryption engine 26, the recording and reproducing section 27, and the function limiter 28 constituting the recording medium 2 may be implemented by such a semiconductor processor as LSI. In that case, these constituent elements may be separately made into individual chips or may be made into a chip which includes some or all of the constituent elements. The password register 20, the password related information storage 22, and the encryption key manager 25 may be implemented by a semiconductor memory. The above described semiconductor processor and the semiconductor memory may be made into a chip. The data storage 51 may be used as the semiconductor memory.

The data communicator 11, the server verifier 12, the password setter 14, the limitation cancel requester 15, the user data processor 16, the media password information provider 30a, and the media password information updater 31a constituting the information recording device 1a of the second embodiment may be implemented by such a semiconductor processor as LSI. In that case, these constituent elements may be separately made into individual chips or may be made into a chip which includes some or all of the constituent elements. The password manager 13 may be implemented by a semiconductor memory. The above described semiconductor processor and the semiconductor memory may be made into a chip. The data storage 51 may be used as the semiconductor memory.

The password update counter 21, the password related information provider 23, the password comparator 24, the encryption engine 26, the recording and reproducing section 27, the function limiter 28, and the media ID storage 29 constituting the recording medium 2a may be implemented by such a semiconductor processor as LSI. In that case, these constituent elements may be separately made into individual chips or may be made into a chip which includes some or all of the constituent elements. The password register 20, the password related information storage 22, the encryption key manager 25, and the media ID storage 29 may be implemented by a semiconductor memory. The above described semiconductor processor and the semiconductor memory may be made into a chip. The data storage 51 may be used as the semiconductor memory.

Although LSI is used to describe the semiconductor memory here, the semiconductor memory may be referred to as IC, system LSI, super LSI, ultra LSI according to the integration density.

Further, the technique of making the above described constituent elements into an integrated circuit is not limited to LSI, and the integrated circuit may be implemented by a dedicated circuit or a general purpose processor. An FPGA (Field Programmable Gate Array) which is capable of programming the manufactured LSI or a reconfigurable processor which is capable of reconfiguring connection and setting of the circuit cells inside the LSI may be used.

Furthermore, when a new technology to make the functional blocks into an integrated circuit is developed to replace the LSI as advancement or derivation of the semiconductor technology, the new technology may be used in making the functional blocks into an integrated circuit. Application of such technology as biotechnology can be considered.

Each processing of the embodiments may be practiced by hardware, or may be practiced by software (including the case the processing is practiced with an OS (operating system), middleware, or a predetermined library). In addition, each processing may be practiced by mixed processing (cooperation) of software and hardware. That is, since the information recording device 1 and the recording medium 2 have a processor and a memory storing programs, the functions of the above described respective components may be practiced by the processor executing the programs on the memory.

The embodiments have been described above as examples of the technology of the present disclosure. For those examples; the attached drawings and the detailed description have been provided.

Consequently, in order to exemplify the above described technology, the constituent elements shown in the attached drawings and described in the detailed description may include not only a constituent element which is necessary to solve the problem but also a constituent element which is not necessary to solve the problem. Therefore, the unnecessary constituent element should not be instantly recognized as a necessary constituent element merely because it is shown in the attached drawings and described in the detailed description.

Also, since the above described embodiments are for exemplifying the technology of the present disclosure, various changes, substitutions, additions, omissions and the like may be performed on the embodiments without departing from the scope of the claims and the equivalent of the claims. In addition, the respective constituent elements described in the first embodiment may be combined to make a new embodiment.

INDUSTRIAL APPLICABILITY

Since the recording medium and the information recording device according to the present disclosure encrypt and record data, they can reduce the risk in the event that the recording medium is lost. Further, without distinguishing a newly bought recording medium from the currently used recording medium, they can perform password update as required on the recording medium which manages data encryption. Therefore, they may be highly possible to be used in the field of camera recorder for professional use, in which a large amount of media is used and application of the advanced security is required.

What is claimed is:

1. An information recording system including a non-transitory recording medium capable of limiting a function by password and an information recording device for controlling the non-transitory recording medium, wherein
the non-transitory recording medium comprises:
a password register operable to store an input password;
a password update counter operable to count each updating event of a password, the password being stored in the password register;
a password related information storage operable to store an update count of the password;
a password related information provider operable to output information stored in the password related information storage according to a READ request issued from the information recording device;

a password comparator operable to compare an input password with a password stored in the password register; and a function limiter operable to limit a predetermined function of the recording medium according to the comparison result from the password comparator, and the information recording device comprises:

a password manager operable to store a password and a password identification ID which is associated with the update count of the password; and a limitation cancel requester operable to: select a password stored in the password manager with reference to the update count of the password and the password identification ID output from the password related information provider; and output the selected password into the recording medium in order to cause the password comparator of the recording medium to compare the passwords.

2. The information recording system according to claim 1, wherein the information recording device further comprises a password setter, and when the password is updated, the password setter adds 1 to the update count of the password output from the password related information provider and stores the password associated with the update count obtained by the addition in the password register of the recording medium.

3. The information recording system according to claim 1, wherein the password manager stores a plurality of passwords and a plurality of password identification IDs at the time of factory shipment.

4. The information recording system according to claim 2, wherein the password setter sets the password to the password register for a plurality of times with reference to the update count of the password provided by the password related information provider until the password becomes the password corresponding to a desired update count when the password of the recording medium is updated.

5. The information recording system according to claim 2, wherein the recording medium further comprises a password related information setter, wherein the password manager stores a password list and version information of the password list, the password list storing a plurality of passwords associated with the update counts, the password related information setter sets version information of the password to the password related information storage, the password being set by the password setter to the recording medium, and the limitation cancel requester selects a predetermined password from among the plurality of passwords stored in the password manager with reference to the update count of the password and the version information provided from the password related information provider.

6. The information recording system according to claim 1, wherein the password identification ID is equal to the lower N bits (N is a natural number) of the update count of the password.

7. A non-transitory recording medium comprising:

a password register operable to store an input password;

a password update counter operable to count each updating event of a password, the password being stored in the password register;

a password related information storage operable to store an update count of the password;

a password related information provider operable to provide the update count of the password stored in the password related information storage according to a READ request issued from an information recording device;

a password comparator operable to compare an input password with a password stored in the password register; and a function limiter operable to limit a predetermined function of the recording medium according to the comparison result from the password comparator, wherein the password stored in the password register is a password which is selected with reference to the update count of the password and a password identification ID which is associated with the update count of the password.

8. An information recording system including a non-transitory recording medium capable of limiting a function by password and an information recording device for controlling the non-transitory recording medium, wherein the non-transitory recording medium comprises:

a password register operable to store an input password;

a password update counter operable to count each updating event of a password, the password being stored in the password register;

a password related information storage operable to store an update count of the password;

a password related information provider operable to provide information stored in the password related information storage in response to a READ request issued from the information recording device;

a media ID storage operable to store a media ID specific to the recording medium;

a password comparator operable to compare an input password with a password stored in the password register; and a function limiter operable to limit a predetermined function of the recording medium according to the comparison result from the password comparator, and the information recording device comprises:

a password manager operable to store media password information which associates the media ID with a password and the update count of the password; and a limitation cancel requester operable to: select a password stored in the password manager with reference to the media ID and the update count of the password obtained from the recording medium; and input the selected password in the recording medium in order to cause the password comparator of the recording medium to compare the passwords;

a password creator operable to create a new password; and a password setter operable to register the new password created in the password creator to the password register of the recording medium.

9. An information recording system including an information recording device for controlling a non-transitory recording medium which is capable of limiting a function by password and a password server for managing the password, wherein the information recording device comprises:

a password manager operable to store media password information which associates a media ID specific to the recording medium with a password and an update count of the password;

a limitation cancel requester operable to: select a password stored in the password manager with reference to the media ID and the update count of the password obtained from the recording medium; and input the selected password in the recording medium in order to cause the password comparator of the recording medium to compare the passwords;
a password creator operable to create a new password;
a password setter operable to register the new password created in the password creator to a password register of the recording medium;
a data communicator operable to send/receive the media password information;
a server verifier operable to verify the password server via the data communicator;
a media password information provider operable to send the new password, the update count of the password after setting the new password, and the media ID to the password server; and
a media password information updater operable to compare the update count of the password in the media password information received from the password server with the update count of the password in the media password information stored in the media password information provider with respect to the same media ID, and update the media password information stored in the password manager only for the recording medium which has the update count of the password received from the password server bigger than the update count of the password stored in the media password information provider, and
the password server comprises:
a data communicator operable to send/receive the media password information to/from the information recording device;
a device verifier operable to verify the information recording device via the data communicator, and according to the verification result, control the media password information to be exchanged between the password server and the information recording device;
an all password information manager operable to store media password information of all of the objective recording medium (media);
a media password information provider operable to output the media password information to the information recording device;
a media password information updater operable to compare the update count of the password in the media password information received from the information recording device with the update count of the password in the media password information in the all password information manager, and only when the update count of the password in the received media password information is bigger, update the media password information stored in the all password information manager.

10. An information recording device for controlling a non-transitory recording medium, the non-transitory recording medium being capable of limiting a function by password, comprising:
a password manager operable to store media password information which associates a media ID specific to the recording medium with a password and an update count of the password;
a data communicator operable to send/receive the media password information;
a server verifier operable to verify a password server via the data communicator;
a limitation cancel requester operable to: select media password information stored in the password manager with reference to the media ID and the update count of the password obtained from the recording medium; and output the password recorded in the selected media password information in the recording medium in order to cause the password comparator of the recording medium to compare the passwords;
a password creator operable to create a new password;
a password setter operable to register the new password created in the password creator to the recording medium;
a media password information provider operable to send the new password which is set via the password setter, the update count of the password after setting the new password, and the media ID to the password server; and
a media password information updater operable to compare the update count of the password in the media password information received from the password server with the update count of the password in the media password information stored in the media password information provider with respect to the same media ID, and update the media password information stored in the password manager only for the recording medium which has the update count of the password received from the password server bigger than the update count of password stored in the media password information provider.

* * * * *